United States Patent [19]
Tone et al.

[11] 3,997,957
[45] Dec. 21, 1976

[54] DEVICE FOR REPLACING PACKINGS OF FLANGE JOINTS

[75] Inventors: Hisashi Tone, Kosugimachi; Tadao Chujyo, Takaoka, both of Japan

[73] Assignee: Hokko Co., Ltd., Japan

[22] Filed: July 24, 1975

[21] Appl. No.: 598,632

[30] Foreign Application Priority Data
Aug. 14, 1974  Japan .................. 49-96998[U]

[52] U.S. Cl. .................. 29/239; 29/256; 254/100
[51] Int. Cl.² .................. B23P 19/04
[58] Field of Search ......... 29/256, 259, 260, 262, 29/264, 239; 254/104, 100

[56] References Cited
UNITED STATES PATENTS

| | | | |
|---|---|---|---|
| 1,964,470 | 6/1934 | King | 29/264 |
| 2,353,623 | 7/1944 | Saul | 254/100 |
| 2,789,343 | 4/1957 | Millsap | 29/259 |

FOREIGN PATENTS OR APPLICATIONS

| | | | |
|---|---|---|---|
| 826,905 | 1/1960 | United Kingdom | 29/239 |

Primary Examiner—James L. Jones, Jr.
Attorney, Agent, or Firm—Weingarten, Maxham & Schurgin

[57] ABSTRACT

A device for replacing the packings of flange joints with new ones which comprises: a supporting body consisting of a sleeve and a pair of supporting bars attached to said sleeve; a movable member movably attached to said sleeve; a wedge member fixed to the lower end of said movable member; and a pair of supporting arms to connect said supporting body with the flanges.

2 Claims, 3 Drawing Figures

3,997,957

DEVICE FOR REPLACING PACKINGS OF FLANGE JOINTS

BACKGROUND OF THE INVENTION

This invention relates to a device for replacing the packings of flange joints. More particularly, the invention relates to a device which is used for replacing the old worn packings of flange joints by new ones in the existing pipelines.

The pipelines for transferring fluid are commonly connected together with a plurality of flange joints. When the pipings or the packings interposed between flange joints are changed, the bolts connecting the flange joints are firstly loosened and removed, and the tip of relatively flat tool such as a screw driver or chisel is then struck into the space between the tightly secured flanges so as to form a clear space between them. However, when the pipeline is used for the transferring of inflammable fluid, it is dangerous to strike the screw driver or chisel into the space between two flanges even if the fluid is discharged from the pipeline because the remaining vapor of the fluid may catch the fire by the spark caused by the used tool.

Further, in chemical plants for example, the pipelines between the plants are supported on high stand frames where the operations are difficult to be carried out. Therefore the working is also dangerous, in addition to the above-mentioned inflammability, because the workers are liable to suffer the drops of remaining fluid in the pipes.

BRIEF SUMMARY OF THE INVENTION

It is therefore the principal object of the present invention to eliminate the above-mentioned disadvantages and dangers.

Another object of the present invention is to provide a novel and improved device for the replacing the worn packings of flanges without any difficulty.

A further object of the present invention is to provide a novel device for the replacement of flange packings which device can be easily made at low cost and gives trouble-free operation.

In accordance with the present invention, the device for replacing the packing of flange joints comprises: a supporting body; a pair of supporting arms attached to said supporting body and having a fixing means to be inserted into the bolt holes of flanges, the space between said pair of supporting arms being adjusted to the total thickness of said flanges to be engaged with; a vertically movable member held by said supporting body; and a wedge member positioned at the lower end of said movable member.

BRIEF DESCRIPTION OF THE DRAWINGS

The nature, principle and details of the invention will be more clearly apparent from the following detailed description with respect to a preferred embodiment of the invention with the accompanying drawings, in which.

DETAILED DESCRIPTION OF THE INVENTION

Figure 1:
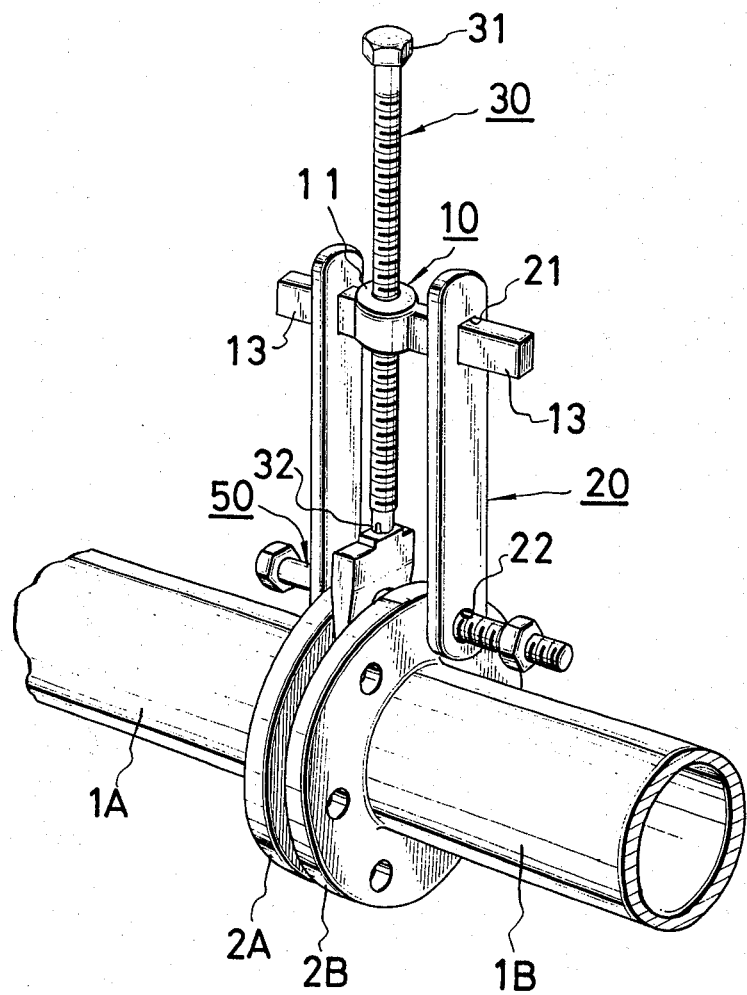
FIG. 1 is a perspective view of an embodiment of the device in the present invention which is fitted to the flange joint portion of a pipeline.
Figure 2:
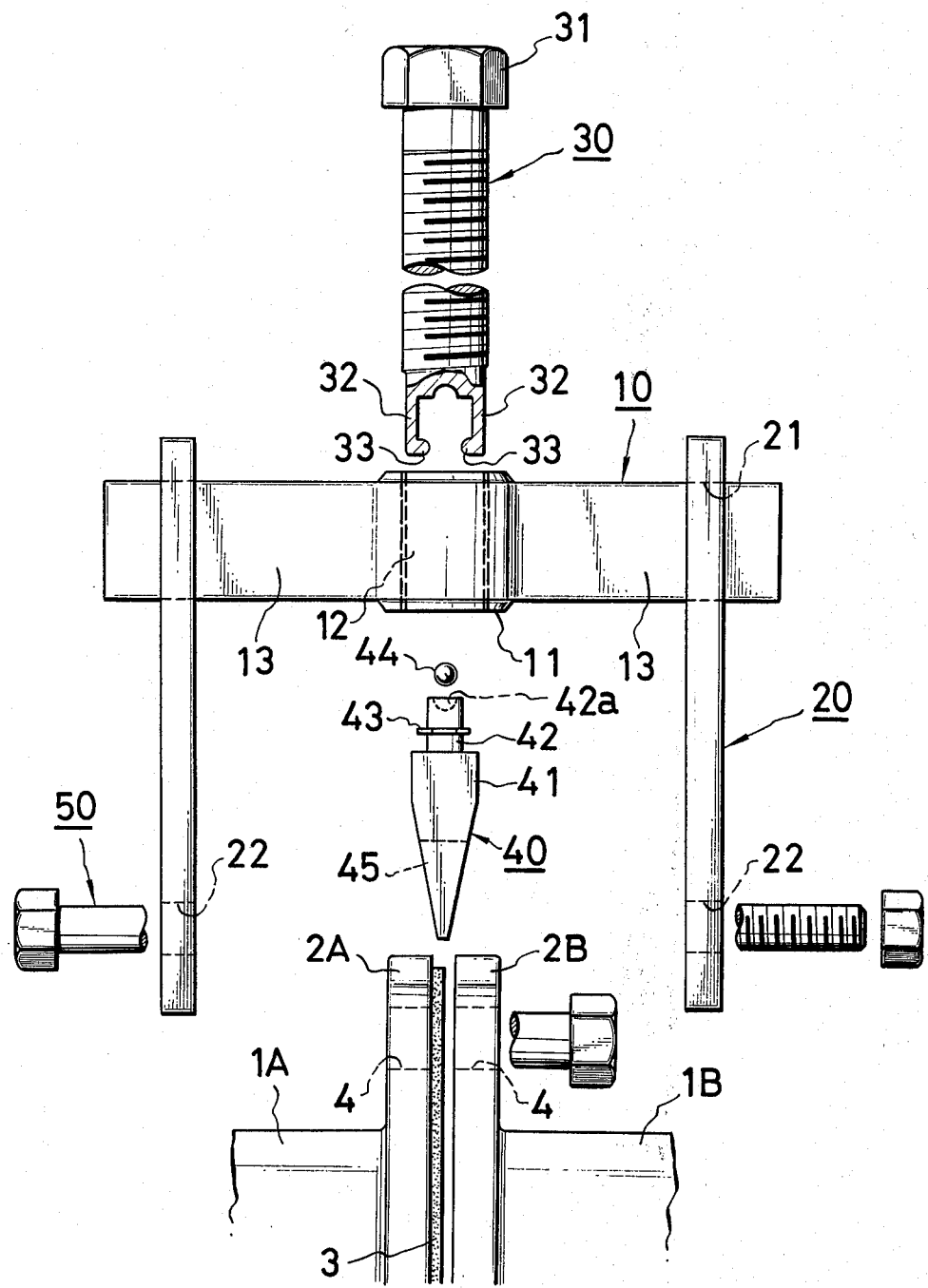
FIG. 2 is an assembly drawing in front elevation of the device as shown in FIG. 1.

Referring now to the drawings, an embodiment of the device of the present invention for replacing the packings of flange joints will be explained in detail. The numerals 1A and 1B indicate a portion of existing pipeline for transferring fluid materials such as solvents, inflammable fluids, liquid acids and other various fluids. Both pipes 1A and 1B are connected with flanges 2A and 2B, where a packing sheet 3 is inserted between the flanges 2A and 2B for sealing and the flanges 2A and 2B are clamped tightly by inserting bolts 5 into bolt holes 4.

The device of the present invention is used for replacing the worn packing with new one which is interposed between the above-mentioned flanges of the pipeline. The device of the invention for replacing the packings of flanges joints comprises a supporting body 10 having a sleeve 11 in its middle portion and a female screw thread hole 12 is formed through the sleeve 11. Further, a pair of bars 13 is provided to both sides of the sleeve 11.

The supporting body 10 is further provided with a pair of supporting arms 20, each of which has an aperture 21 near the upper end portion to receive therein each end of said bars 13, while a bolt hole 22 just like the above-mentioned bolt holes 4 of the flange is formed near the lower end of the supporting arm 20.

Still further, the supporting body 10 is provided with a movable member 30 which is threaded into the foregoing female screw hole 12 and a bolt head 31 is formed at the upper end of the movable member 30 so as to rotate the member 30. The lower end of said movable member 30 is provided with forked ends 32 to catch the upper end of a wedge member mentioned below. Further, a pair of small projections 33 is formed at diametrically opposite points on the insides of the forked ends 32.

Figure 3:
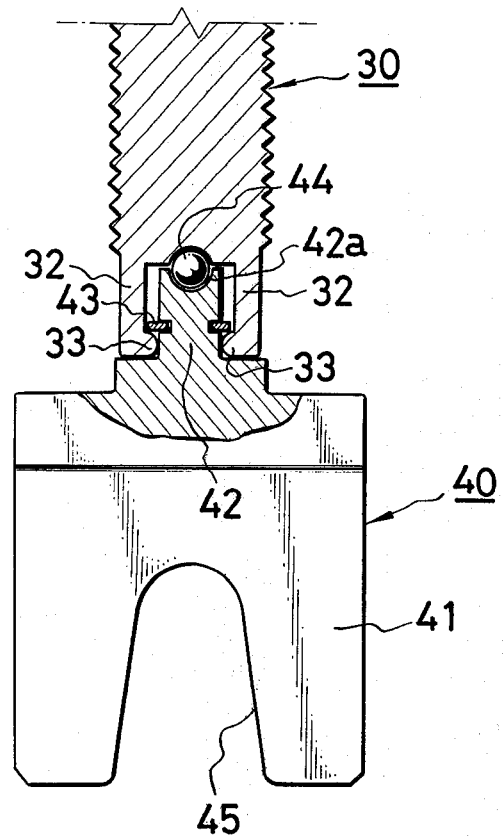
FIG. 3 is a partial cross-sectional view showing the connection between the movable member and wedge member.

The lower end of the movable member 30 is thus pivotally connected to the wedge member 40 which comprises a wedge piece 41 and a pin 42. In the use of the device, the wedge piece 41 is pushed into the space between two flanges 2A and 2B and the pin 42 attached on the upper face of the wedge piece 41 has the function to connect the wedge piece 41 to the forked ends 32 of the movable member 30. The pin 42 is provided with a groove in the middle portion and a snap ring 43 is fitted into the groove of the pin. Thereby, as shown in FIG. 3, the snap ring 43 is seized by the small projections 33 of forked ends 32.

Further, a depression 42a is formed on the upper surface of the pin 42 and a ball 44 is fitted therein. Therefore, the above-mentioned movable member 30 can be freely rotated on the pin 42 of the wedge member 40. By the way, a notch 45 is formed in the lower portion of the wedge piece 41 in order to avoid the interruption caused by the bolt 50 in the use, which will be explained below.

The numeral 50 indicates a long bolt to be inserted into the bolt holes of flanges 2A and 2B so as to connect the lower ends of supporting arms 20 with the flanges 2A and 2B. The free end of the long bolt 50 is provided with a screw thread to receive a nut.

Even though the above-mentioned movable screw 30 has been exemplified by a screw bolt, any other corresponding means to push down the wedge member 40 such as a hydraulic cylinder or a toggle mechanism may be employed in place of the screw bolt.

In the following, the operation of packing change using the device of the present invention will be explained. In the first place, the supporting arms 20 attached to the bars 13 of the supporting body 10 is opened to form a clearance a little larger than the total thickness of the flanges 2A and 2B and the bolt 50 is inserted into a bolt hole 22 of one supporting arm 20, the bolt holes of flanges 2A and 2B, and the bolt hole 22 of the other supporting arm 20.

The wedge piece 41 of the wedge member 40 attached to the lower end of the movable member 30 is then fitted to the space between the flanges 2A and 2B, and the bolt head 31 of the movable member 30 threaded in the female screw hole 12 of supporting body 10 is rotated by a tool such as a spanner so as to advance the movable member 30. Thereby the wedge member 40 attached to the lower end of the movable member 30 is thrust and the wedge piece 41 is thus inserted into the space between the flanges 2A and 2B by the wedge action to form a clearance D between the flanges.

Since the wedge member 40 is connected with the movable member 30 by the engagement between the small projections 33 of the forked ends 32 and the pin 42, only the downward movement of the movable member 30 is transferred to the wedge member 40 as the result of the rotation of the movable member 30.

Since the interruption of the forward movement of the wedge piece 41 caused by the bolt 50 during the feeding of the wedge member 40 is avoided by the provision of the notch 45, the wedge piece 41 can be thrusted into the space between the flanges 2A and 2B for a considerable depth. Thus when a proper gap is formed between the flanges 2A and 2B, the packing stuck to the flanges can be easily peeled off and new packing is fitted there.

As being understood from the above disclosure with regard to the embodiment of the present invention, the wedge member is supported by the supporting body and at the same time, the supporting body is attached to the flanges by the bolt fixed to the lower end of the supporting arms. Thus, the wedge member is effectively pushed forward and the wedge piece can be inserted into the space between the flanges, thereby the stuck flanges are separated. The device of the invention having the above-mentioned structure and function can be operated from any direction even when it is fitted to a pipeline. Further, when the supporting arms having a desired length is used, workers are able to be free from the danger such as the dropping or leakage of remaining fluid from the pipeline.

It should be emphasized, however, that the specific embodiment described and shown herein is intended as merely illustrative and in no way restrictive of the invention.

What is claimed is:

1. A device for replacing the packings of flange joints, said device comprising:
    a supporting body formed with a sleeve and a pair of elongated bars extending outwardly in opposite directions from said sleeve;
    an elongated movable member extending through said sleeve and being longitudinally movable therein;
    a wedge member having a wedge-shaped end adapted to be inserted between the two flanges of said flange joints for purposes of spreading such flanges, said wedge being formed with a pin longitudinally projecting from the end of said wedge member opposite said wedge-shaped end, said pin being formed with an annular groove therearound;
    means for rotatably connecting said wedge member to one end of said movable member, said connecting means comprising:
        opposed fork members formed on said one end of said movable member, each fork member being formed with inwardly extending projections at their distal ends;
        a snap ring in said groove in said pin, said pin being formed with a first rounded depression in the top end thereof, said movable member being formed with a similar second rounded depression in said one end juxtaposed with said first rounded depression; and
        a thrust ball seated in said first and second rounded depressions, said inwardly extending projections engaging and holding said snap ring thereby rotatably coupling said movable member and said wedge member, the thrust of said movable member being transmitted to said wedge member through said thrust ball;
    a pair of supporting arms slidably mounted at their upper ends on a respective one of said elongated bars, each of said bars having holes through their lower ends; and
    a long bolt extending through said holes in said lower ends of said supporting arms, said long bolt being adapted to extend through bolt holes through one of said flange joints, said lower ends of said supporting bars being adapted to be positioned on either side of said flange joint.

2. A device for replacing the packings of flange joints as claimed in claim 1, in which said sleeve of said supporting body is provided with an internal female screw thread and said movable member is a screw bolt to be engaged with said female screw thread of said sleeve.

* * * * *